United States Patent
Dumler et al.

(10) Patent No.: US 10,167,133 B2
(45) Date of Patent: Jan. 1, 2019

(54) SHAKER WITH AN OUTER CONTAINER AND WITH AN INNER CONTAINER MOVABLE THEREIN

(71) Applicant: keeeper GmbH, Stemwede (DE)

(72) Inventors: Alex Dumler, Hamburg (DE); Florian M. Witt, Wentorf (DE); Johanna Königsberger, Hamburg (DE); Matthias Hecker, Hamburg (DE); Thorsten Plate, Hamburg (DE); Andrew Ferrier, Ottawa (CA)

(73) Assignee: KEEEPER GmbH, Stemwede (DE)

( * ) Notice: Subject to any disclaimer, the term of this patent is extended or adjusted under 35 U.S.C. 154(b) by 0 days.

(21) Appl. No.: 15/885,885

(22) Filed: Feb. 1, 2018

(65) Prior Publication Data

US 2018/0215527 A1    Aug. 2, 2018

(30) Foreign Application Priority Data

Feb. 2, 2017 (EP) .................................... 17154463

(51) Int. Cl.
   *B65D 83/06* (2006.01)
   *A47J 43/22* (2006.01)
   *B65D 77/04* (2006.01)

(52) U.S. Cl.
   CPC .............. *B65D 83/06* (2013.01); *A47J 43/22* (2013.01); *B65D 77/048* (2013.01)

(58) Field of Classification Search
   CPC .. B65D 83/06; B65D 47/0809; B65D 90/587; B65D 90/626; B61D 7/20; A47G 19/24
   USPC ........................................................ 222/434
   See application file for complete search history.

(56) References Cited

U.S. PATENT DOCUMENTS

| 922,315 | A | * | 5/1909 | McLellan | ................ A47K 5/10 |
| | | | | | 222/185.1 |
| 2,035,735 | A | * | 3/1936 | Wilmer | ................ B65D 47/286 |
| | | | | | 222/230 |
| 2,294,393 | A | | 4/1939 | Erne | |

(Continued)

FOREIGN PATENT DOCUMENTS

| DE | 83 32 094 | 2/1984 |
| EP | 0 205 935 | 12/1986 |

(Continued)

*Primary Examiner* — Benjamin R Shaw
(74) *Attorney, Agent, or Firm* — Gudrun E. Huckett

(57) ABSTRACT

A shaker has an outer container and an inner container moveable inside the outer container. The outer container side wall has an opening through which a first portion of the inner container side wall can be grasped. A space between the outer container side wall and the inner container side wall accommodates an energy accumulator. The inner container, at rest, is pressed with the first portion of the inner container side wall against the opening in the outer container side wall by the energy accumulator and covers the opening. The inner container is movable, counter to the energy accumulator force, transversely relative to a longitudinal axis of the outer container into a displacement position. The inner container has a discharge opening which, when the inner container moves away from the rest position, is moved across a sieve provided in the dispensing opening of the outer container floor.

10 Claims, 5 Drawing Sheets

(56) References Cited

U.S. PATENT DOCUMENTS

| | | | | |
|---|---|---|---|---|
| 2,199,754 A | * | 5/1940 | Penrod | B65D 83/06 |
| | | | | 222/366 |
| 2,207,120 A | * | 7/1940 | Greig | B65D 83/06 |
| | | | | 222/202 |
| 2,296,595 A | * | 9/1942 | Booty | B65D 83/06 |
| | | | | 222/325 |
| 2,319,233 A | * | 5/1943 | Hoppe | A47K 5/10 |
| | | | | 222/181.2 |
| 2,343,734 A | * | 3/1944 | Barber | A47G 19/24 |
| | | | | 222/129 |
| 2,695,708 A | | 11/1949 | Dennis | |
| 2,597,165 A | * | 5/1952 | Minturn | A47G 19/24 |
| | | | | 222/513 |
| 2,601,061 A | * | 6/1952 | Schwartz | A47G 19/24 |
| | | | | 222/162 |
| 3,130,874 A | * | 4/1964 | Bulmer | A47G 19/34 |
| | | | | 222/142.8 |
| 4,168,019 A | * | 9/1979 | Hausam | G01F 11/18 |
| | | | | 222/185.1 |
| 2014/0299049 A1 | | 10/2014 | Constantino, Jr. et al. | |

FOREIGN PATENT DOCUMENTS

| | | |
|---|---|---|
| EP | 0 526 706 | 2/1993 |
| WO | 02/064006 | 8/2002 |

* cited by examiner

SHAKER WITH AN OUTER CONTAINER AND WITH AN INNER CONTAINER MOVABLE THEREIN

BACKGROUND OF THE INVENTION

The present invention relates to a shaker with an outer container and with an inner container movable therein, for dispensing a granular or powdery sprinkled material from a storage space formed in the inner container through a sieve arranged in the dispensing opening of the shaker.

Devices of the type in question are known from the documents EP 0 526 706 A2 and U.S. Pat. No. 2,294,393. The devices disclosed therein are used, for example, for the dispensing and dosing of powdery medicaments. The inner container is freely movable inside the outer container in order to be able to execute movements of its own when the outer container is shaken, as a consequence of which, when the inner container strikes hard against the inner face of the outer wall of the outer container, the resulting shock pulse carries over to the powdery medicament located in the inner container. The powdery medicament in the inner container thus comes loose and trickles from an opening located in the inner container into the outer container and from there also out of the outer container. A sieve can be located in this case in the dispensing opening of the inner container and/or in the dispensing opening of the outer container.

This way of releasing a sprinkled material, through the movement of an inner container, and dispensing it from the shaker has not proven suitable for all types of sprinkled material. In particular, sprinkled materials that are used for the domestic preparation of meals, for example flour, icing sugar or condiments, tend to form lumps that are not loosened again simply by agitation of the shaker. Thus, sprinkled materials of these kinds can be suitably dosed only with difficulty when they are sprinkled using such devices. For such sprinkled materials, therefore, shakers with an inner container and an outer container are not used, and instead use is made of shakers in which a movable delivery element is moved across a sieve. The particles to be sprinkled are in this case moved across the sieve surface by the delivery element, caught by the material webs of the sieve and pressed by the delivery element into the sieve openings, from which the particles then fall from the shaker. Examples of such shakers are found in document EP 0 205 935 A1 or DE 83 32 094.6. In these devices, however, the delivery element is in each case driven by complex mechanisms which are difficult to keep clean and are susceptible to defects.

The object of the present invention is to create a shaker in which the sieving device has a drive means that is simple to operate and easy to clean.

SUMMARY OF THE INVENTION

For a device of the type in question, the object is achieved by the fact that the side wall of the outer container has in one region an opening through which a first portion of the side wall of the inner container can be grasped when the outer container is gripped, a space is formed in the interior of the outer container between a second portion of the side wall of the inner container and the side wall of the outer container, the inner container, in its rest position, is pressed with the first portion of its side wall against the opening in the side wall of the outer container by at least one energy accumulator arranged in the space such that the side wall of the inner container covers the opening to the interior of the outer container, the inner container is movable, counter to the force of the at least one energy accumulator, transversely with respect to the longitudinal axis of the outer container to a displacement position, and the inner container has a discharge opening which, in a displacement movement of the inner container from the rest position to a displacement position, is moved across a sieve which is located in the floor of the outer container and which has an associated dispensing opening.

The arrangement of an inner container in an outer container and the mobility of the inner container counter to one or more energy accumulators create a technically straightforward and easy-to-use shaker structure. To be able to sprinkle material using the shaker, it suffices to take hold of the outer container in one hand and place the fingers around it such that the fingers lie in the region of the opening on the side wall of the inner container. The shaker is then held over the location at which the material is intended to be sprinkled. To begin sprinkling, the fingers simply have to be pressed against the inner container, such that the latter is moved into the interior of the outer container counter to the force of the energy accumulator, and then let loose again such that the compressed energy accumulator moves the inner container back to the rest position. During the transverse movements of the inner container inside the outer container, the discharge opening is always moved over the sieve located underneath. Sprinkled material trickles in the process from the inner container into the sieve and falls from there through the dispensing opening out of the shaker. The movements of the inner container are repeated for as long as the sprinkled material is intended to trickle from the shaker.

The structural parts of the shaker can be produced cost-effectively, for example as plastic injection-molded parts. The shaker is basically composed only of the outer container and inner container and the one or more energy accumulators. The one or more energy accumulators can also be produced as plastic parts. As energy accumulators, it is possible, for example, to use a spring or an elastic foam body or comparable elements which, upon deformation, take up energy and release the latter again upon reverse deformation. There are also the structural parts for the discharge opening and the sieve, but these are not particularly complex and can likewise be produced cost-effectively from plastic or another material. All of the structural parts are easy to clean and, for this purpose, can be placed in a dishwasher.

According to one embodiment of the invention, the outer container is open toward the top, and the inner container, with at least one energy accumulator secured thereon, can be removed in an upward direction from the outer container. This makes the cleaning of the individual structural parts quick and easy. After the structural parts have been cleaned, the inner container can likewise be pushed quickly and easily back along the longitudinal axis of the outer container into its position of use in the outer container. At the bottom, the discharge opening of the inner container and the sieve in the outer container then lie directly on each other again in a functionally ready manner in the position of use of the inner container. Special assembly work is not needed here, and the shaker is immediately ready for operation again.

According to one embodiment of the invention, in the position of use of the inner container in the outer container, at least one energy accumulator can be connected with form-fit and/or force-fit engagement to the side wall of the outer container. Through the connection of the one or more energy accumulators to the outer wall of the outer container, the inner container is fixed in place in the outer container in its position of use when the opposite side of the at least one energy accumulator is also connected with form-fit and/or force-fit engagement to the inner container. The inner container cannot then fall so easily out of the outer container. The connection of the energy accumulator to the side walls can be realized, for example, by a button which latches in a recess in the side walls of the inner and/or outer container and can only be pressed out or pulled out of the latter again from the outside or inside, respectively.

According to one embodiment of the invention, one or more energy accumulators are designed as elliptic springs. In an elliptic spring, two leaf springs are placed together in a pair against one another to form an approximate elliptical or oval shape or are produced directly in one piece. Because of the load at the center, the bending moment is greatest at the middle of the spring length. By virtue of the double leaf spring, sufficiently strong restoring forces can be built up in the spring in order to move the inner container back to its rest position again when the pressing force applied to the inner container by the fingers subsides.

According to one embodiment of the invention, the upper end of the inner container has a collar piece which widens in an upward direction and protrudes above the outer container. The collar piece can be a separate structural part that has been connected subsequently to the inner container, or the collar piece has been cast integrally together with the inner container in a plastic injection mold. By means of the collar piece, the inner container can be easily filled from the top. If the collar piece widens in an upward direction, particularly in a portion protruding above the outer container, the collar piece can also cover the space between the inner container and outer container, in which space the at least one energy accumulator is located, without the collar piece colliding with the outer container during the use of the shaker. By means of the collar protruding above the space, a situation is avoided where, during the filling of the inner container, sprinkled material is able to get into the space and there interfere with the mobility of the inner container.

According to one embodiment of the invention, a cover can be inserted into the collar piece. With the cover, the interior of the inner container is closed at the top. The cover is removable in order to be able to fill the inner container. The cover protects the contents of the inner container against dirt entering from outside. The cover can be provided with an elastic sealing ring in order to improve the sealing effect.

According to one embodiment of the invention, a cover can be mounted on the dispensing opening located on the underside of the outer container. If material to be sprinkled is still present in the inner container, it can no longer trickle in an uncontrolled manner out of the shaker when the shaker is put away. Moreover, dirt cannot get into the sieve and the inner container from underneath.

According to one embodiment of the invention, a guide groove extending parallel to the longitudinal axis of the outer container is formed on the inner face of the side wall of the outer container. The guide groove serves the purpose of guiding the at least one energy accumulator and/or the inner container when the latter is pushed into the interior of the outer container. This makes handling easier and leads the one or more energy accumulators into the correct installation position.

According to one embodiment of the invention, the sieve located in the floor of the outer container has sieve webs which extend obliquely or transversely with respect to the direction of movement of the inner container in the outer container. The oblique or transverse extent of the sieve webs provides a good rubbing effect on the material to be sprinkled when it slides over the sieve webs, as a result of which smaller particles can be torn away from lumps of material with a pulling movement.

According to one embodiment of the invention, in the discharge opening in the inner container, sieve webs are formed which have an orientation opposite to that of the sieve webs located in the floor of the outer container. By means of the sieve webs in the inner container, which are provided additionally to the sieve webs in the outer container, the material to be sprinkled can additionally be reduced in size with a shearing movement between the sieve webs.

It is noted expressly that each of the above-described embodiments of the invention can be combined individually, but also in any desired combination, with the subject matter of the independent claim, unless there are any technical impediments to doing so.

Further modifications and refinements of the invention will emerge from the following description of the subject matter and from the drawings.

BRIEF DESCRIPTION OF THE DRAWINGS

The invention will now be described in more detail on the basis of an illustrative embodiment.

DESCRIPTION OF PREFERRED EMBODIMENTS

Figure 1:
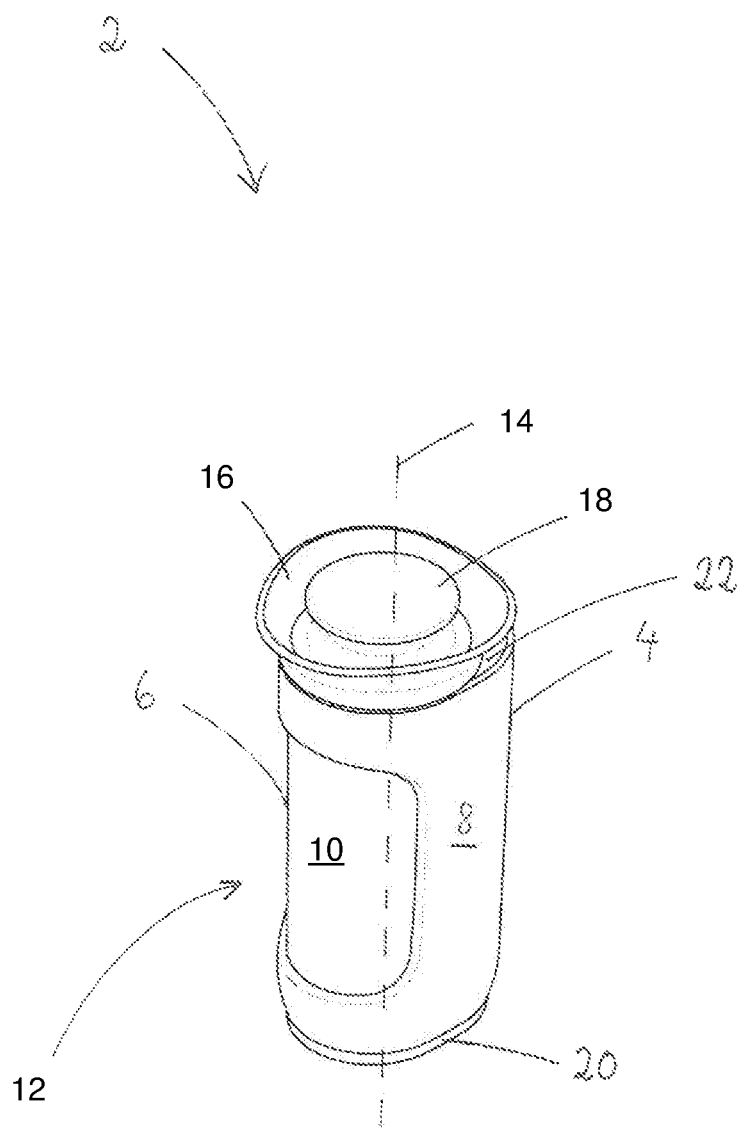
FIG. 1 shows a view of a shaker.

FIG. 1 shows a view of the shaker 2. The shaker 2 has an outer container 4 and an inner container 6 fitted therein. The outer container 4 has a side wall 8; the inner container has a side wall 10. In the side wall 8 of the outer container 4 there is an opening 12 through which the side wall 10 of the inner container 6 can be grasped.

The shaker 2 and the outer container 4 have a longitudinal axis 14 which extends in the vertical direction. The inner container 6 is movable transversely with respect to this longitudinal axis 14, since the inner container 6, from its rest position depicted in FIG. 1, is moved inward to a displacement position and back again to the rest position.

To be able to fill the inner container 6 more easily, the upper end of the inner container 6 has a collar piece 16. The collar piece 16 widens in an upward direction like a funnel, as a result of which the introduction of free-flowing bulk material is made simpler. Moreover, the collar piece 16 at least partially covers the space 22 in the interior of the outer container 4.

In the illustrative embodiment, a cover 18 is fitted into the collar piece 16. The sprinkled material in the interior of the inner container 6 is protected by the cover 18 against contamination.

A cover 20 is mounted on the underside of the outer container 4. The cover 20 ensures that material to be sprinkled does not accidentally escape from the shaker. The shaker 2 can be set down on the lower cover 20. The cover 20 preferably has a plane surface that can be used as a standing surface.

A first portion of the side wall 10 can be seen in the opening 12 in FIG. 1. The size of the opening 12 is such that, when a hand is engaged around the outer container 4, several fingers can be placed in said opening. The fingers then rest on the side wall 10 of the inner container 6, of which a first portion is discernible in the region of the opening 12.

In the region of a second portion of the side wall 10 of the inner container 6 there is a space 22 in which the side wall 10, in the rest position of the inner container 6, is at a distance from the adjacent side wall 8 of the outer container 4. As an example of energy-accumulating elements, springs 24 can be arranged in the space 22, against which springs 24 the inner container 6 is movable from the rest position inside the outer container 4.

Figure 2:
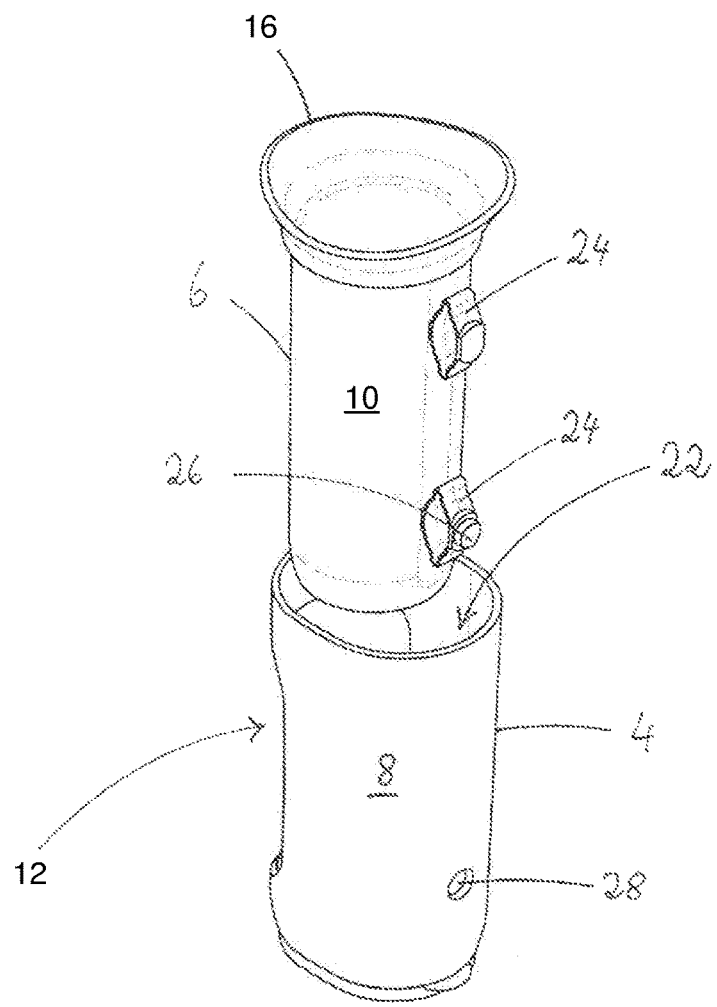
FIG. 2 shows a view of the shaker depicted in FIG. 1, with the inner container lifted out of the outer container.

In FIG. 2, the shaker 2 from FIG. 1 is shown in a view in which the inner container 6 is lifted out of the outer container 4. It can be seen from this view that the opening 12 extends over a relatively large angle range of the outer circumference of the outer container 4. In the illustrative embodiment, the angle is greater than 90°, such that the side wall 10 of the inner container can be easily actuated by the fingers even in the pressed-in position.

The springs 24 can be seen clearly in FIG. 2, said springs 24 being mounted on the second portion of the side wall 10 of the inner container 6 facing toward the space 22. The springs 24 are shown in a relaxed position in FIG. 2. When the inner container 6 is pushed into the outer container 4, the springs 24 should be at least slightly tensioned so that they are able to press the inner container 6 at least gently against the opening 12. In this way, in the rest position of the inner container 6, the opening 12 remains covered and closed by the side wall 10 of the inner container 6.

A button 26 is located on the lower spring 24 in the illustrative embodiment, said button 26 being able to latch into the latch opening 28 when the inner container 6 is pushed into the operating position in the outer container 4. On account of the connection of the button 26 to the latch opening 28, the inner container 6 is no longer able to rotate about the longitudinal axis 14 in the interior of the outer container 4. This improves usability and gives a better grip when actuating the inner container 6 during use.

Figure 3:
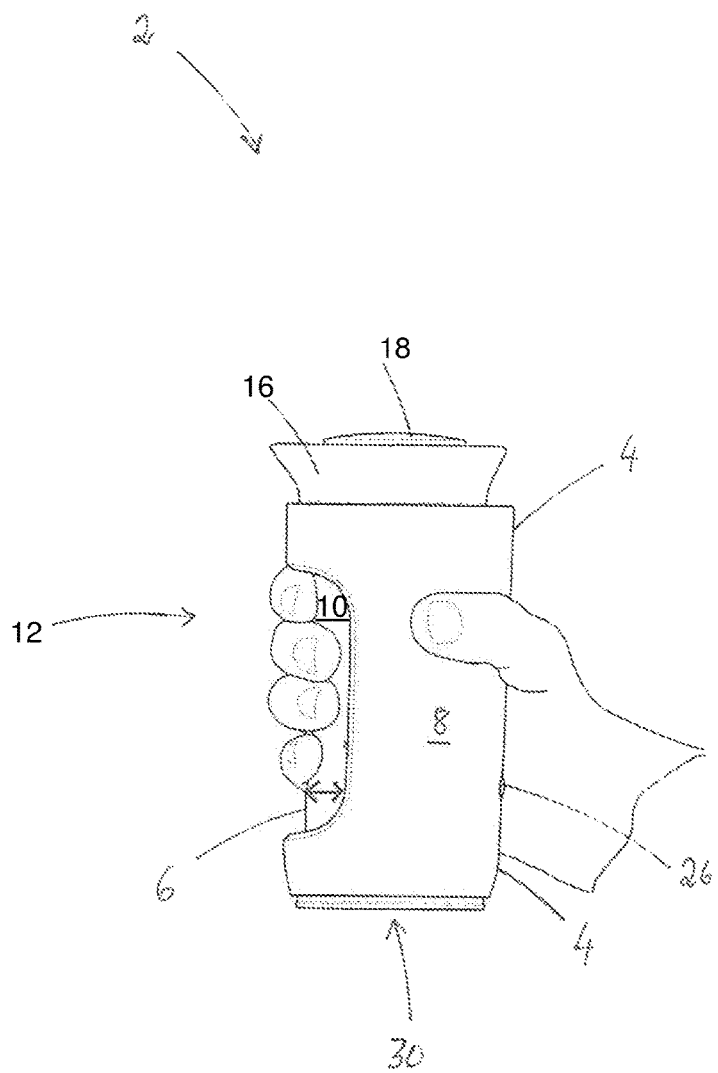
FIG. 3 shows the shaker when it is being held in the hand during use.

FIG. 3 shows the shaker 2 when held in the hand of a person using it. It can be seen clearly from this view that the opening 12 is large enough to allow four fingers to be placed on the first portion of the side wall 10 of the inner container 6. While the hand is enclosing the outer container 4, the fingers bearing on the side wall 10 of the inner container 6 can press the latter inward into the interior of the outer container 4 and allow it to spring back again, as is indicated by the double arrow. The direction of movement of the inner container 6 is thus substantially transverse to the longitudinal axis 14 of the shaker 2. By alternately pressing and releasing the inner container 6 with the fingers, the inner container 6 can execute oscillating movements inside the outer container 4. When doing this, the outer container 4 of the shaker 2 can be held over a location onto which the material emerging from the shaker 2 is intended to be sprinkled.

Figure 4:
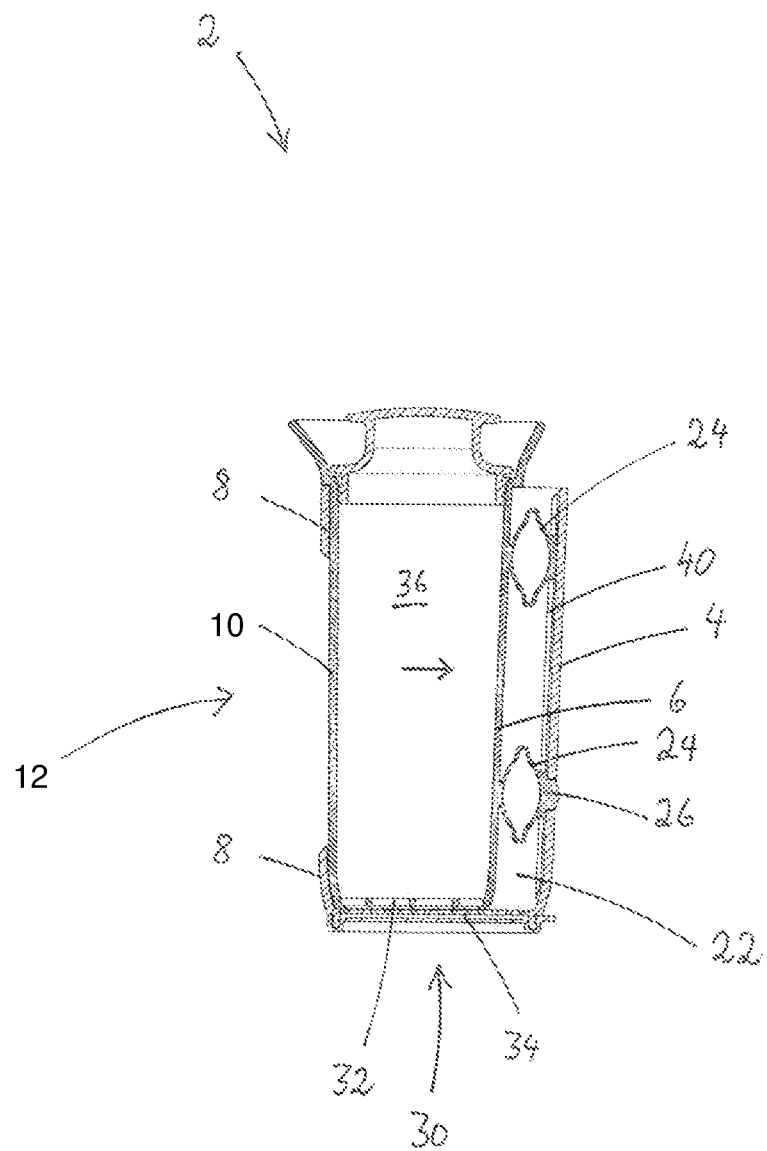
FIG. 4 shows a cross-sectional view through the shaker with the inner container in the rest position.

FIG. 4 shows the shaker 2 in a cross-sectional view in which the inner container 6 is located in its rest position. In the rest position, the first portion of the side wall 10 of the inner container 6 is pressed against the side wall 8 of the outer container 4 bordering the opening 12. The space 22 is at its maximum size in the rest position of the inner container 6. The inner container 6 remains in its rest position shown in FIG. 4 because it is held in this position by the springs 24. A displacement of the inner container 6 in the direction of the arrow is possible only when the inner container 6 is moved counter to the springs 24 by an applied force.

It can be seen from FIG. 4 that a sieve 34 comprising sieve webs 38a is located in the dispensing opening 30 of the outer container 4, through which sieve 34 the material to be sprinkled, located in the storage space 36, can drop down out of the shaker 2. At the lower end of the inner container 6 there is a discharge opening 32 through which the material to be sprinkled can pass from the storage space 36 of the inner container 6 to the region of the sieve 34.

FIG. 4 finally also shows a guide groove 40 along which the springs 24 and/or parts of the side wall 10 of the inner container 6 can be inserted into the interior of the outer container 4. The guide groove 40 is located on the inner face of the side wall 8 of the outer container 4. It extends parallel to the longitudinal axis 14 of the outer container. If the outer container has a slight conicity, the parallelism can be adapted to this conicity.

Figure 5:
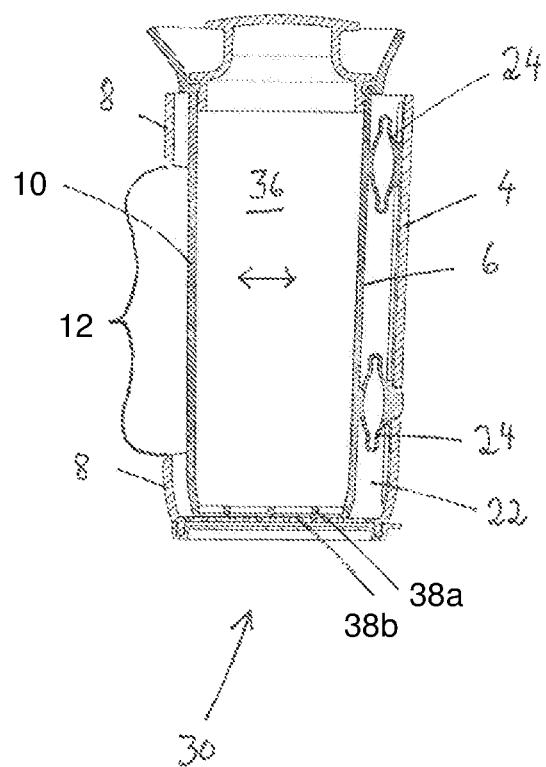
FIG. 5 shows a cross-sectional view through the shaker with the inner container in the displacement position.

FIG. 5 shows the inner container 6 in a displacement position. In the displacement position, the side wall 10 of the inner container 6 in the region of the opening 12 is moved away from the side wall 8 of the outer container 4 surrounding the opening 12. Through the displacement of the inner container 6 inside the outer container 4, the space 22 is made smaller and the springs 24 are compressed. The springs 24 have thereby built up restoring forces, with which the inner container 6 is moved back again to the rest position after the pressure from the direction of the opening 12 has been released. The mobility of the inner container 6 inside the outer container 4 with and counter to the spring force of the springs 24 is indicated by the double arrow.

It can be seen from FIG. 5 that sieve webs 38a, 38b are located respectively in the region of the dispensing opening 30 and of the discharge opening 32, which sieve webs 38a, 38b permit screening of the sprinkled particles falling from the inner container 6. When the inner container 6 is moved inside the outer container 4, the respective sieve webs 38a, 38b slide back and forth across each other. During this relative movement between the sieve webs 38a, 38b, larger particles of the material that is to be sprinkled can be reduced in size between the edges of the sieve webs 38a, 38b.

The illustrative embodiment described above serves only to explain the invention. The invention is not limited to this illustrative embodiment. A person skilled in the art will have no difficulty in modifying the illustrative embodiment in a manner that is deemed suitable in order to adapt it to a specific case of use.

The specification incorporates by reference the entire disclosure of European priority document 17 154 463.8 having a priority filing date of Feb. 2, 2017.

While specific embodiments of the invention have been shown and described in detail to illustrate the inventive principles, it will be understood that the invention may be embodied otherwise without departing from such principles.

What is claimed is:
1. A shaker (2) comprising:
an outer container (4) comprising an outer container side wall (8) and a floor with a dispensing opening (30);
a sieve (34) disposed in the dispensing opening (30);
an inner container (6) disposed in an interior of the outer container (4) so as to be movable therein and comprising an inner container side wall (10);
the inner container (6) comprising a storage space (36) for a granular or powdery material;

the outer container side wall (8) comprising an opening (12) through which a first portion of the inner container side wall (10) can be grasped when the outer container (4) is gripped;

a space (22) formed in the interior of the outer container (4) between a second portion of the inner container side wall (10) and the outer container side wall (8);

at least one energy accumulator (24) arranged in the space (22);

the inner container (6), in a rest position, pressed with the first portion of the inner container side wall (10) against the opening (12) in the outer container side wall (8) by the at least one energy accumulator (24) such that the inner container side wall (10) covers the opening (12) of the outer container side wall (8) relative to the interior of the outer container (4);

the inner container (6) movable, counter to a force of the at least one energy accumulator (24), in a direction of movement transversely relative to a longitudinal axis (14) of the outer container (4) into a displacement position;

the inner container (6) comprising a discharge opening (32) which, when moved by a displacement movement of the inner container (6) from the rest position to a displacement position, is moved across the sieve (34) disposed in the dispensing opening (30).

2. The shaker (2) according to claim 1, wherein the outer container (4) comprises a top that is open, wherein the inner container (6), with the at least one energy accumulator (24) secured on the inner container (6), is configured to be removed in an upward direction from the outer container (4).

3. The shaker (2) according to claim 1, wherein, in a position of use of the inner container (6) in the outer container (4), the at least one energy accumulator (24) is connected with form fit and/or force fit to the outer container side wall (8).

4. The shaker (2) according to claim 1, wherein the at least one energy accumulator (24) is an elliptic spring.

5. The shaker (2) according to claim 1, wherein an upper end of the inner container (6) comprises a collar piece (16) which widens in an upward direction and projects past the outer container (4) in the upward direction.

6. The shaker (2) according to claim 5, further comprising a cover (18) configured to be inserted into the collar piece (16).

7. The shaker (2) according to claim 1, further comprising a cover (20) configured to be mounted at the dispensing opening (30).

8. The shaker (2) according to claim 1, wherein the outer container side wall (8) comprises a guide groove (40) extending parallel to the longitudinal axis (14) of the outer container (4), wherein the guide groove (40) is arranged on an inner face of the outer container side wall (8).

9. The shaker (2) according to claim 1, wherein the sieve (34) comprises sieve webs (38*a*) which extend obliquely or transversely relative to the movement direction of the inner container (6) in the outer container (4).

10. The shaker (2) according to claim 9, wherein the discharge opening (32) of the inner container (6) comprises sieve webs (38*b*) with an orientation opposite to the sieve webs (38) of the sieve (34).

* * * * *